United States Patent [19]

Chuang et al.

[11] Patent Number: 5,521,999
[45] Date of Patent: May 28, 1996

[54] OPTICAL SYSTEM FOR A LASER PRINTER

[75] Inventors: Chih-Li Chuang, Pittsford; Andrew F. Kurtz, Rochester, both of N.Y.

[73] Assignee: Eastman Kodak Company, Rochester, N.Y.

[21] Appl. No.: 214,936

[22] Filed: Mar. 17, 1994

[51] Int. Cl.$^6$ ........................................ G02B 6/42
[52] U.S. Cl. .................... 385/88; 369/44.23; 369/112; 385/33; 385/93
[58] Field of Search .................. 385/31, 33–35, 385/88, 92, 93; 369/44.14, 44.15, 44.23, 112

[56] References Cited

U.S. PATENT DOCUMENTS

| | | | |
|---|---|---|---|
| Re. 33,722 | 10/1991 | Scifres et al. | 385/33 |
| 4,143,940 | 3/1979 | Khoe . | |
| 4,203,652 | 5/1980 | Hanada . | |
| 4,243,399 | 1/1981 | Khoe et al. . | |
| 4,253,724 | 3/1981 | Minoura et al. . | |
| 4,307,409 | 12/1981 | Greenig et al | 346/108 |
| 4,327,963 | 5/1982 | Khoe et al. . | |
| 4,337,531 | 6/1982 | Willemsen | 369/44.15 |
| 4,370,021 | 1/1983 | Khoe et al. . | |
| 4,440,470 | 4/1984 | Khoe . | |
| 4,495,704 | 1/1985 | Hammer et al. . | |
| 4,639,075 | 1/1987 | Salour et al . | |
| 4,674,011 | 6/1987 | Patton et al. | 362/32 |
| 4,701,013 | 10/1987 | Jurczyszyn et al. . | |
| 4,708,426 | 11/1987 | Khoe . | |
| 4,720,632 | 1/1988 | Kaneko | 250/235 |
| 4,722,081 | 1/1988 | Fujito et al. . | |
| 4,763,979 | 8/1988 | Heywang . | |
| 4,775,214 | 10/1988 | Johnson . | |
| 4,780,877 | 10/1988 | Snitzer | 372/6 |
| 4,784,466 | 11/1988 | Khoe et al. . | |
| 4,786,132 | 11/1988 | Gordon . | |
| 4,799,210 | 1/1989 | Wilson et al. | 369/112 X |
| 4,807,954 | 2/1989 | Oyamada et al . | |
| 4,832,469 | 5/1989 | Noguchi et al . | |
| 4,919,506 | 4/1990 | Covey | 385/35 |
| 4,921,320 | 5/1990 | DeJager et al. . | |
| 4,931,637 | 6/1990 | Succari et al. | 250/235 |
| 4,948,221 | 8/1990 | Yates . | |
| 4,955,025 | 9/1990 | Mears et al. | 372/6 |
| 4,966,444 | 10/1990 | Droegemueller et al. . | |
| 4,969,702 | 11/1990 | Anderson . | |
| 5,031,991 | 7/1991 | Nakatsu et al. . | |
| 5,046,817 | 9/1991 | Uenishi et al. | 359/328 |
| 5,054,878 | 10/1991 | Gergely et al. | 385/33 |
| 5,066,092 | 11/1991 | Droegemueller et al. | 385/33 |
| 5,080,506 | 1/1992 | Campbell et al. | 385/29 |
| 5,080,706 | 1/1992 | Snyder et al. | 65/102 |
| 5,088,803 | 2/1992 | Buzawa | 385/33 |
| 5,108,167 | 4/1992 | Kandpal et al. | 385/33 |
| 5,140,608 | 8/1992 | Karpol et al. | 372/101 |
| 5,151,810 | 9/1992 | Blanding et al. | 359/198 |
| 5,181,224 | 1/1993 | Snyder | 372/101 |
| 5,224,111 | 6/1993 | Stilwell, Jr. et al. | 372/38 |
| 5,237,348 | 8/1993 | Blanding et al. | 346/160 |
| 5,256,851 | 10/1993 | Presby | 385/33 X |

FOREIGN PATENT DOCUMENTS

| | | | |
|---|---|---|---|
| 0323850 | 7/1989 | European Pat. Off. . | |
| 3112167A1 | 10/1982 | Germany | G02B 5/176 |
| 61-059411 | 3/1986 | Japan | G02B 26/10 |
| 02051174 | 2/1990 | Japan | G03G 15/04 |

*Primary Examiner*—John D. Lee
*Attorney, Agent, or Firm*—Svetlana Z. Short

[57] ABSTRACT

An optical system for a laser printer. The optical system includes a diode laser for producing a laser beam at a predetermined wavelength for scanning across a photosensitive media. A single mode fiber is connected to the diode laser for transmitting the beam from the diode laser to an object plane.

12 Claims, 4 Drawing Sheets

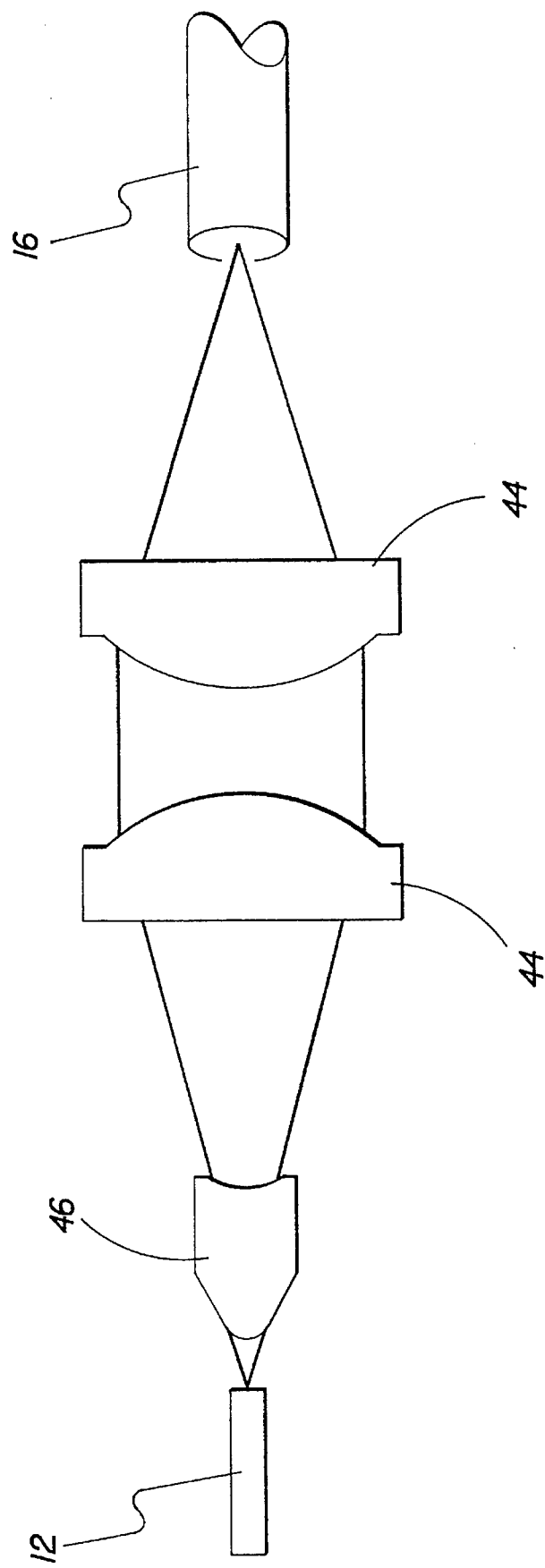

OPTICAL SYSTEM FOR A LASER PRINTER

FIELD OF THE INVENTION

The present invention relates to an optical system, and more particularly, to the optical system of a laser printer.

BACKGROUND OF THE INVENTION

Optical scanners of a type which are used in laser printers generally include a rotatable polygon mirror which is used to scan a light beam across a receiving medium. The scan optical elements used in such scanners are designed to achieve a flat tangential field for good beam focus and to correct for so-called pyramidal errors, that is, spot position errors in the cross-scan direction resulting from angular misalignment of the facets on the polygon; the optical elements must also produce a relatively straight scan line and correct for the F-θ distortion condition. The input optics for such scanners, which typically consist of a laser, collimating and beam shaping optics, and noise reduction and laser modulation means, precondition the incoming beam to the polygon mirror. These optics control various beam parameters, including the size, shape, and wavefront quality, as well as controlling the noise and various thermal effects. The receiving medium in the scanners can be a photographic film or a photosensitive medium such as a photoconductive drum.

U.S. Pat. Nos. 4,921,320, 5,151,810 and 5,237,348 illustrate the basic configuration of the input optics for a laser printer, consisting of a laser source, beam shaping optics, a rotating polygon mirror, and beam scan optics. As is typical, the input optics to the polygon mirror consist of a diode laser, a collimator lens, a beam expander, and a beam shaping system. These beam shaping optics usually comprise a system of spherical lenses, mirrors, positive cylinder lenses, and negative cylinder lenses. Recent literature discloses considerable effort in improvements to the design of the post-polygon scan optics. Whereas, the principal features of the prepolygon input optics have generally changed less and are described by earlier patents.

U.S. Pat. No. 4,203,652 discloses a multiplicity of means for shaping the beam from the diode laser to compensate for the different angles of divergence and different sources of divergence in the orthogonal directions. These systems comprise various combinations of spherical lenses and crossed cylinder lenses for collimating and beam expanding the beam to match the design parameters.

U.S. Pat. No. 4,253,724 describes some of the other optical components typical to the pre-polygon optical path for laser printers. This patent describes the input optical means for an IR (Infra Red) based laser printer, which includes direct laser modulation of a single mode semiconductor laser, a variety of laser collimating means, an anamorphic afocal beam expander lens system for correcting diode laser astigmatism, and a limiting anamorphic beam shaping aperture.

In such prior art systems, the common variations typical among standard manufactured diode lasers can cause problems. Typically, the laser beam divergence in both the minor and major axis directions can vary by +/−20%. Without corrective action, these variations will cause the spot size at the media to change in size from printer to printer. Within the limits of the pre-polygon optical design, these variations can be corrected for by adjusting an anamorphic beam expander lens system, but at added cost and complexity to the manufacturing process. Alternatively, the beam size can be corrected by apodizing or truncating the beam, though this reduces the available optical power and requires correction in the lens design to compensate for beam truncation effects on the spot size. Finally, the manufacturer, at some cost, can specify delivery only of laser diodes that are tested to meet some predetermined divergence specification.

While the prior art discloses the preconditioning of the beam input to the polygon mirror to adapt to the static features typical of diode lasers, there has also been disclosed a variety of methods for controlling the dynamic properties typical to semiconductor lasers. The features of the emitting area of diode lasers are typically quite small, on the order of a few microns. Often, the laser surface, or front facet, is imaged to the recording media at high magnification. At such high magnifications, small shifts in the position of the laser relative to the collimating lens can cause the image pixel focus to shift at the medium. These shifts can cause significant changes in the image pixel size and shape, which appear as undesirable artifacts in the printed image. As disclosed in U.S. Pat. No. 4,948,221, a common practice to alleviate this problem is to design an athermal head for the laser diode which keeps the laser at the focal point of the collimator as the laser changes. This is done by using a combination of dissimilar materials so that when the temperature changes, the laser position is effectively maintained with respect to the collimator. Thus, the object distance of the optical system does not change. This approach can become very difficult and expensive when the tolerances are tight.

European Patent Application 0 323 850, published Jul. 12, 1989, discloses another method to actively compensate for image pixel motion by sensing its motion and actively adjusting a lens position so as to compensate for the motion. This method does add complexity and cost, but it compensates for thermal changes throughout the entire optical system, rather than for just those parts near the laser.

Once a laser printer is assembled, including the laser-collimator assembly, the pre-polygon beam shaping optics, and the post-polygon scan optics, the laser printer is vulnerable to laser failure. As a result of the extensive and demanding alignment and beam quality specifications common to laser printers, such printers are not typically field serviceable. As laser printers are designed increasingly for more demanding, higher power, higher resolution applications, the field failure of a laser is becoming increasingly costly.

The prior art describes both mechanisms for preconditioning the beam from the laser for compatibility with the polygon and the post-polygon scan optics and mechanisms for minimizing image artifacts caused by thermal variations within the laser package. Yet there is still a need for a relatively simple input optics system for a laser printer in which both the effects of laser variability and thermal expansion and contraction within the laser-collimator assembly are minimized. There is also a need for improving the serviceability of the entire laser printer system to laser failure over prior methods.

It is an object of the present invention to overcome the problems in the prior art discussed above, and to provide an improved laser printer/optical scanner.

SUMMARY OF THE INVENTION

In accordance with the present invention, there is provided an optical system for a laser printer, comprising:

a) a diode laser for producing a laser beam at a predetermined wavelength for scanning across a photosensitive media; and b) a single mode fiber connected to the diode laser for transmitting the beam from the diode laser to an object plane.

BRIEF DESCRIPTION OF THE DRAWINGS

Embodiments of the invention have been chosen for purposes of illustration and description, and are shown with reference to the following drawings wherein:

FIG. 4 is an alternate schematic illustration of another modified coupling assembly for use in coupling the laser diode to the first optical fiber of FIG. 1.

DESCRIPTION OF THE PREFERRED EMBODIMENT

Figure 1:
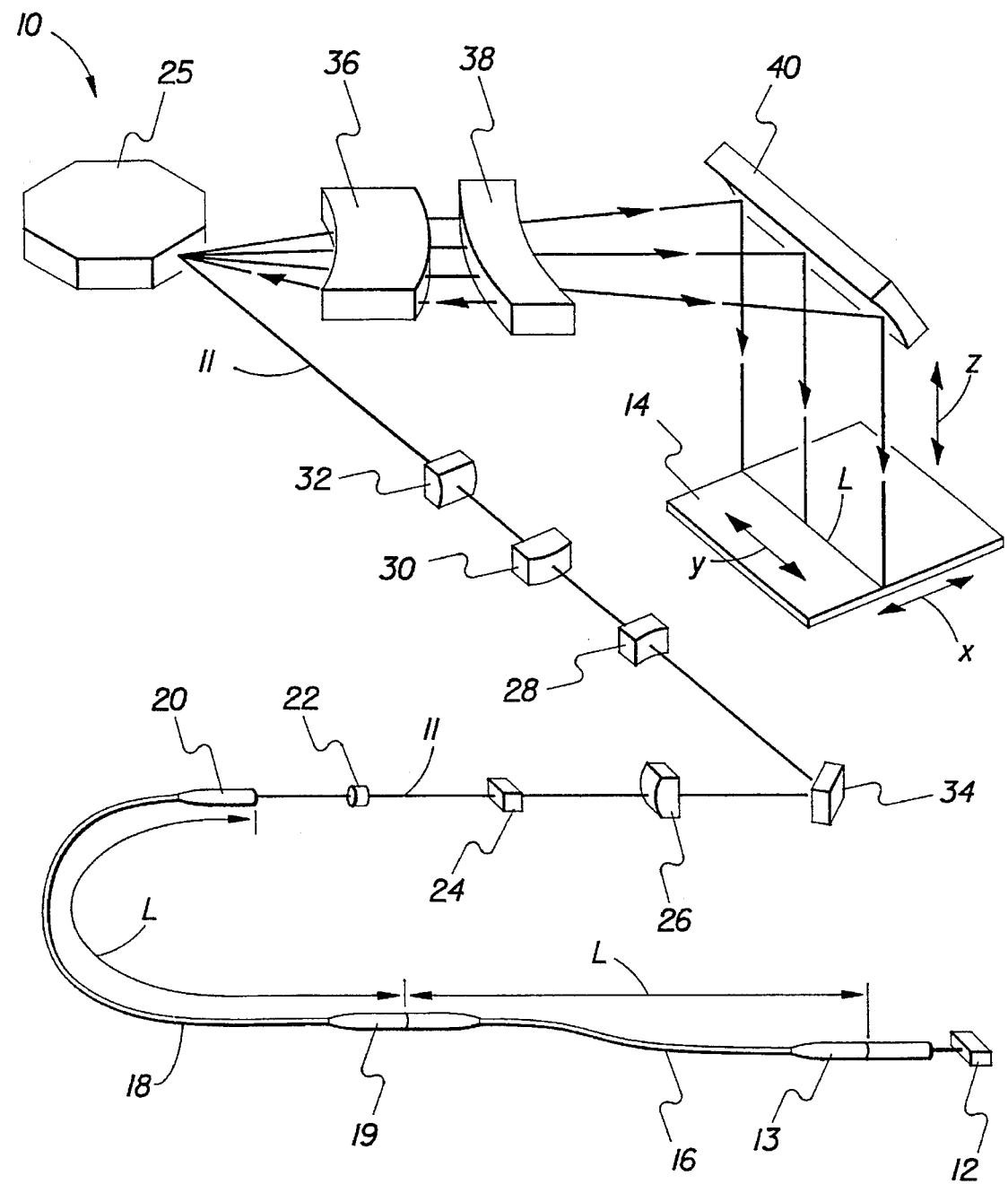
FIG. 1 is a schematic illustrating an optical system made in accordance with the present invention for use in a laser printer.

Referring to FIG. 1, there is illustrated a schematic showing in perspective an optical system 10 made in accordance with the present invention. In the embodiment illustrated, the optical system 10 is designed for use in a laser printer for use in printing photosensitive material. The optical system 10 is particularly useful in a laser printer used to print images on very light sensitive materials, such as x-ray film. The system 10 includes a laser 12 for generating a laser beam 11 along a z (beam path or focus) direction, and means for scanning the laser beam 11 along a line L in the y (scan) direction onto a photosensitive medium 14, such as x-ray film. The medium 14 is supported for movement in an x direction. The optical system 10 is configured to assure that the generated scan line L will be sufficiently straight for the intended printing purposes. Means are provided in accordance with the present invention, as further described below, for controlling the size and shape of the beam 11, for minimizing artifacts such as flare, for modulating and attenuating the beam 11, for minimizing the thermal effects to the optical system and providing an optical system which is reliable, simple in construction and is easy to service.

The system 10 further includes coupling means 13 for coupling of the laser 12 to a first optical fiber 16 which in turn is connected to a second optical fiber 18. The output end 20 of the second fiber is aligned with coupling imaging lens 22 so the laser beam 11 is passed through modulator 24 and is modulated in accordance with information from an image signal generating circuit (not shown), and scanned onto the medium 14 by means of a rotating polygon mirror 25. Modulator 24 may be of any conventional construction, such as an AO Modulator, Model 3200-142, from Crystal Technology. Optical elements, comprising lenses 26,28,30,32 and mirror 34, control the size, shape, beam quality and path of the beam 11 between the modulator 24 and any of the multiple facets of the polygon mirror 25. Optical elements, comprising lenses 36,38 and mirror 40 located between the polygon mirror 25 and medium 14, correct for differences in beam focus in the y direction due to the f-θ condition and correct for displacement of the beam in the x direction due to pyramid facet out-of-plane wobble and angle errors.

The laser 12, in the embodiment illustrated, is a single mode semiconductor laser diode having a predetermined output frequency. In the particular embodiment, the laser diode 12 is designed to operate at a wavelength of 670 nm and has a major axis NA: 0.52 with a range of 0.43–0.64, and a minor axis NA: 0.14 with a range of 0.09–0.19. The Toshiba 9211s laser diode is an example of a suitable laser diode for use in the present invention.

The optical fibers 16,18 are each designed so as to attenuate any higher order modes which might get launched, that is, the optical fiber must be a single mode at the laser wavelength. Thus, the optical fibers 16,18 are constructed in accordance with the following relationship:

$$\lambda \geq \frac{2\pi r}{2.405} \sqrt{N_c^2 - N_{cl}^2}$$

wherein:

$\lambda$ = minimum wavelength needed for laser
$r$ = core radius
$N_c$ = refractive index of the core
$N_{cl}$ = refractive index of the cladding The length of the fibers 16,18 is such that only a single mode will propagate through the fibers. Applicants have found that the fibers 16,18, for the laser diode selected, will each typically have a minimum length l of at least 1 ft (30.48 cms). In the particular embodiment illustrated, fibers 16,18 each have a length l in the range of about 2 to 3 feet. In the particular embodiment illustrated the fibers are laid out in a gentle curved configuration. It is also possible to mount the fibers 16,18 in other configurations. For example, the fibers 16,18 may be wrapped around a mandrel having a diameter of about 1 inch (2.54 cms). The fibers 16,18 in this configuration would strip out higher order modes that may be traveling down the cladding of the fiber.

The beam characteristics, that is, the size and profile, will depend on the fibers used and not on the laser diode. Thermally induced changes in beam size, beam shape, focus errors are not transmitted through the fibers. Therefore, the wide variation in beam divergence that may occur from laser to laser will not have an affect on the beam. Additionally, coupling of the laser to a single mode fiber avoids the problems of thermal shifts between the laser and collimator that may occur. The only other significant variation between different lasers used in the optical system would be the power level of the laser which can be accounted for by calibration during assembly, or by a feedback system. For example, a feedback system may comprise a detector that receives some light transmitted by partially reflecting mirror 34 which controls the power level of the laser diode through an appropriate feed back circuit.

For the reasons discussed above, it can be seen that the use of a single mode fiber desensitizes the optical system to laser divergence, thermal shifts and improves the serviceability of the system, especially with respect to replacement of the laser in the field.

Preferably, the fibers 16,18 are polarized so as to be less sensitive to movement than non-polarized fiber. However, a non-polarized optical fiber may be utilized. An example of a suitable non-polarized fiber may be purchased from Ensign Bickford Optics, Avon, Conn., Fiber SMC-A0630B, which has a 3.8 µm nominal core diameter, a 4.6 µm nominal mode field diameter, and NA of 0.11. An example of a suitable polarized fiber may be purchased from Ensign Bickford Optics, Fiber SMP-A0515B, which has a 3.1 µm×4.2 µm nominal core diameter, a nominal mode filed between 3.7 µm×5.0 µm and is single mode at wavelengths ≥640 nm. If a polarized fiber is used, due to the elliptical shape of the core of the fiber, greater care may be required with respect to the alignment of two fibers.

In the preferred embodiment illustrated in FIG. 1, two optical fibers 16,18 are used. It is to be understood that one or any number of optical fibers may used. If a single optical fiber is used in place of the two fibers 16,18, there would be the advantage of eliminating a coupler and thus improving light efficiency and reducing parts. But this would require that the alignment of the fiber to the collimating lens would have to be robust so that the alignment is maintained within specification if the fiber is removed and returned or replaced. The use of two fibers allows for the replacement of the diode laser 12 without affecting the optical system alignment.

Figure 2:
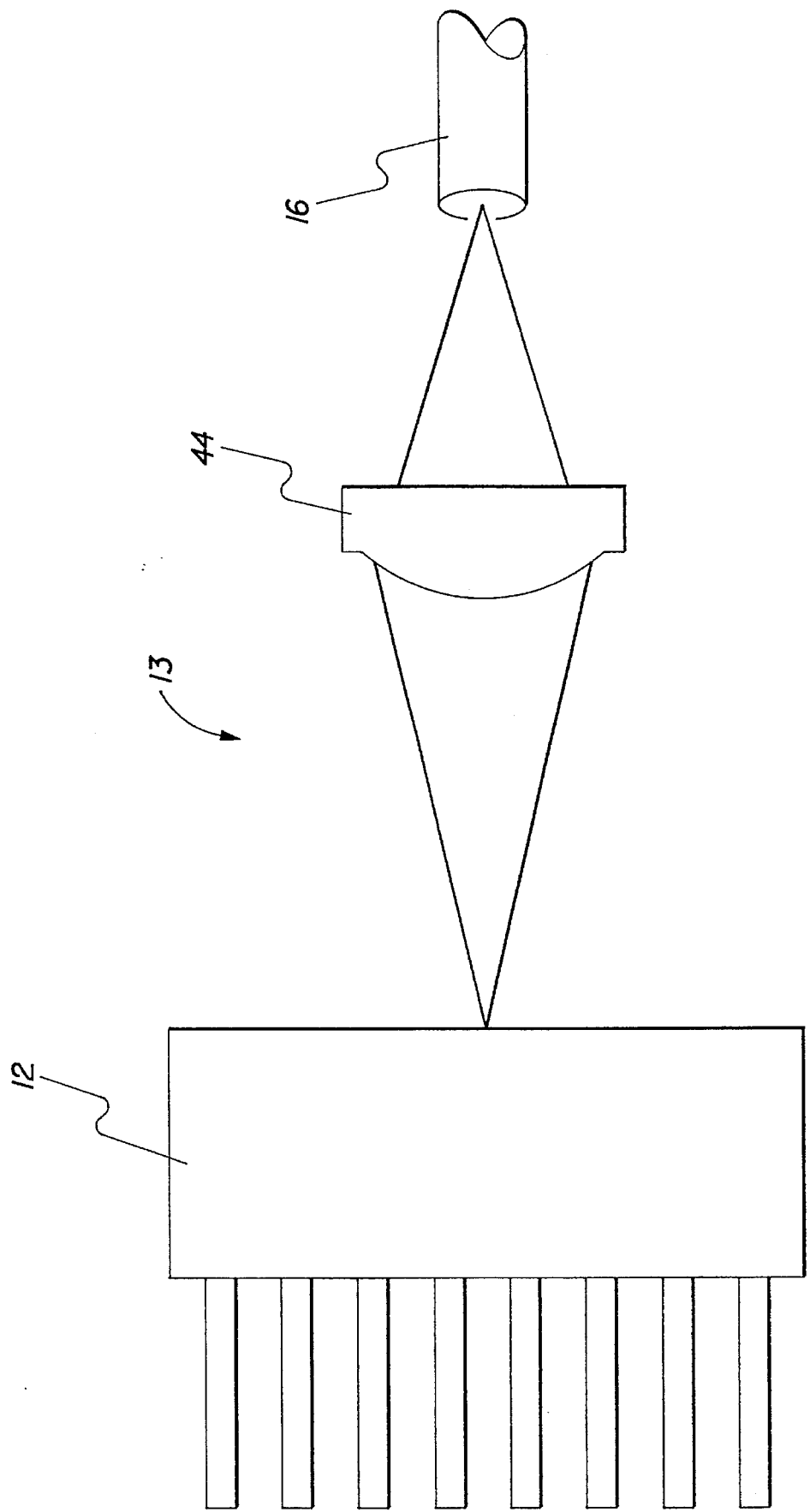
FIG. 2 is an enlarged schematic illustration of the coupling assembly of FIG. 1 used to couple the laser diode to the first optical fiber.

Referring to FIG. 2, there is illustrated in greater detail the coupling means 13 used to couple the laser diode 12 to optical fiber 16. In the particular embodiment illustrated, the coupling means 13 comprises a single glass molded lens 44, for example, a Kodak A-390 lens and a suitable connector, such as may be purchased from AMP Inc., Model No. 5025580-1, for mounting the lens 44 to fiber 16.

For coupling of the two fibers 16,18 together, a more precise and robust connector 19 is preferred. In the particular embodiment illustrated an industry standard FC/PC style connector is provided at each end of fibers 16,18 for connecting of the fibers, for example, an AMP 501506-1 Bushing. It is, of course, understood that any appropriate connector 19 may be used for connecting the fibers 16,18 to each other and to the remain part of the optical system.

Figure 3:
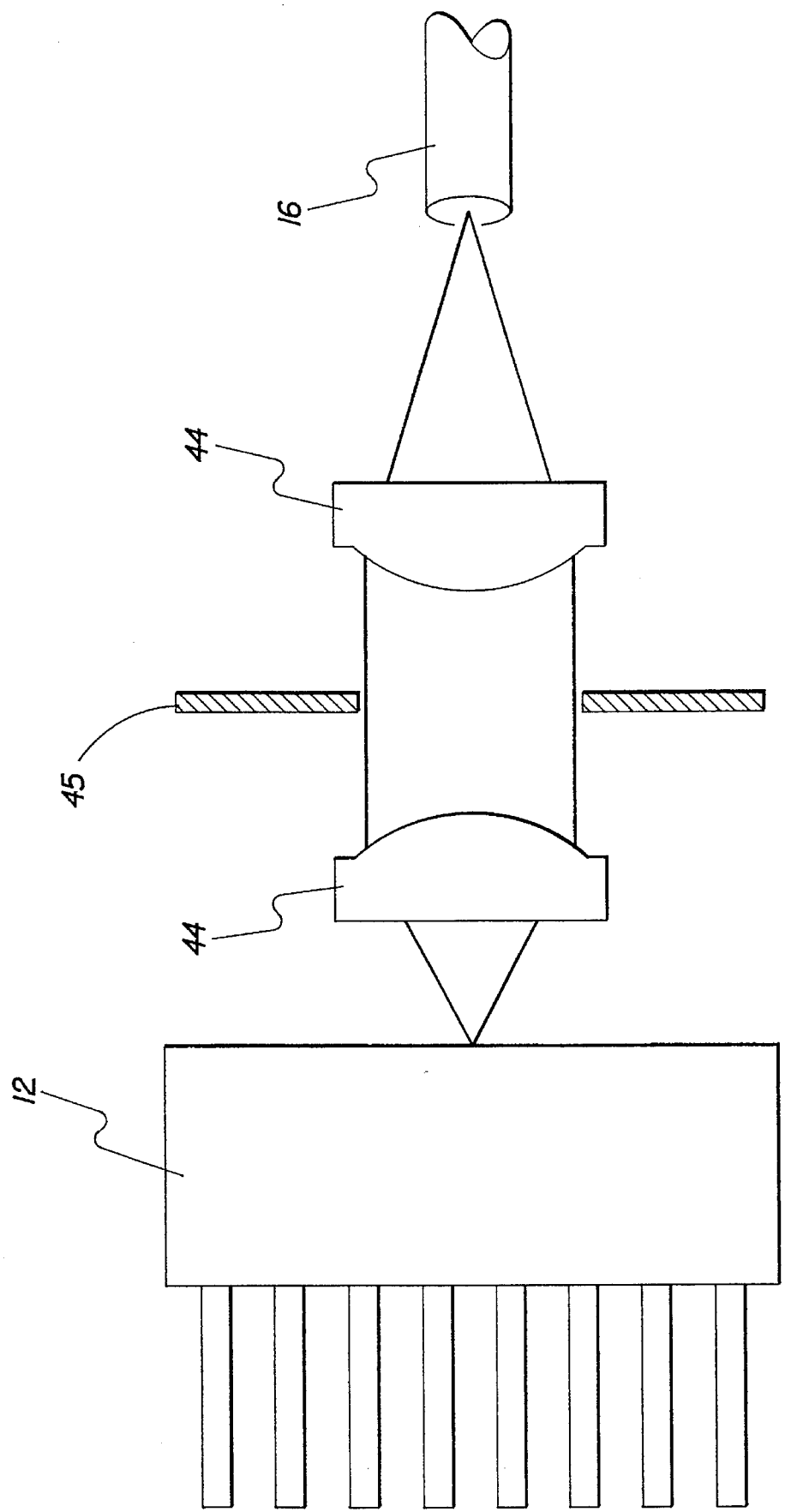
FIG. 3 is an enlarged schematic illustration of a modified coupling assembly for use in coupling the laser diode to the first optical fiber of FIG. 1.

Referring to FIG. 3, there is illustrated a modified coupling means 13 for use in the optical system 10 to connect the laser diode 12 to fiber 16. This coupling means is similar to the embodiment of FIG. 2, like numerals indicating like parts. In particular, two molded glass lens 44 are used. If desired, a beam attenuating means 45 may be placed between the lens 44. For example, an iris, a fixed physical stop, or a filter could be used. It would also be possible to attenuate the beam by introducing transverse offset between the two fibers. In a typical prior art laser printer, attenuation is used to calibrate for different media, different lasers, aging laser, etc. However, use of apertures attenuation in prior art optical systems was not suitable as this would have caused the beam spot to enlarge due to truncation or diffraction effects. But, in an optical system made in accordance to the present invention where a single mode fiber is used, the spot size and shape are constant and not affected by the use of an aperture for attenuation.

In order to increase coupling efficiency other coupling arrangements may be employed. For example, referring to FIG. 4, there is illustrated a modified coupling means for coupling the fiber 16 to the laser 12. This embodiment is also similar to that illustrated in FIG. 2, like numerals indicating like parts. In this embodiment a virtual point source (VPS) lens 46 is placed between the laser diode 12 and glass lens 44. A VPS lens is a special aspheric (hyperbolic) microlens. The VPS lens, when aligned to the laser 12, controls the high divergence direction of the beam so as to be substantially equal to the low divergence direction of the beam. The ratio of the high divergence direction with respect to the low divergence direction should be equal to or less than 2.0. Preferably, the beam is no longer elliptical, but is generally circular. The ellipticity ratio of the beam should be as close to 1 as possible, preferably equal to or less than to 1.25. Also the VPS lens corrects for the astigmatism inherent in the laser diode. The astigmatism should be minimized as much as possible. Generally the astigmatism should be equal to or less than 0.1 λ of the diode, preferably the astigmatism should be brought down to diffraction limited performance, i.e. with a Strehl ratio of equal to or greater than 0.8. This results in a better matching of mode field diameter of the optical fiber and the laser diode beam size. A VPS lens thus has a greater efficiency when used with some inexpensive lens than other lens due to the fact that better matched beam size can be coupled to the fiber more efficiently. The correction of astigmatism also allows greater alignment tolerances between the coupling lens and fiber. Additionally, a VPS lens allows use of attenuating means. However, a VPS lens can present installation problems with the laser. A suitable VPS lens may be purchased from Blue Sky Research, San Jose, Calif., Model VP 700 microlens.

Reference is made to copending application of Daniel Haas entitled "Method and Apparatus for Expanding the Linear-Response domain of a Laser Beam" (Ser. No. 08/214, 919), which was filed concurrently herewith and is hereby incorporated by reference. Disclosed therein is a more detailed describing of the optical fibers 16,18 and the benefits obtained by using such fibers. The use of a single mode optical fiber provides an enlarged dynamic working range of the laser at a single wavelength. This would permit the direct modulation of the beam by simply varying the power to the laser diode. The single mode optical fiber also controls the central shape and divergence of the beam to provide a substantial constant circular symmetrical single mode beam.

In summary, the use of a single mode optical fiber in a laser printer has a number of advantages. Use of a single mode fiber reduces the sensitivity of the optical system to thermal variations in the laser diode since the relationship of the coupling lens 13 to the laser diode 12 is constant, and change in this relationship will only affect the power level of the beam at the media, not the spot focus, size, or shape. The use of a single mode optical has also has the advantage that when the laser diode fails, there is no complex alignment required of the laser with respect to the optical system. All that is required is the replacement of the laser diode in the field. The remainder of the optical system is fixed and thus requires little or no further adjustment. Preferably, replacement modules can be prepared in advance. For example, a module could comprise the laser and at least one of the adjacent lens 14 or 44 as illustrated in FIGS. 3 and 4. Preferably, a module would consist of the laser 12, the coupling means 13 and first fiber 16. The module could be adjusted at the factory so that the field repair person need only remove the old module and connect the new module. The single mode optical fiber also provides a low flare writing spot, which does not have any side lobes, at the media which further enhances the quality of the printing. Utilization of a single mode fiber produces a beam has a smaller NA (smaller angle) and which is circularized. Additionally, the beam can be more readily kept in the center of the lens which contributes to less flare. Also the single mode fiber will circularize a high divergence laser beam which avoid the use of other techniques used to control and shape the beam, such as truncating.

The present invention provides an optical system for a laser printer that is simple in construction and design, reliable, insensitive to thermal shifts, easy to service in the field, and which minimizes the effects of variabilities of the diode lasers.

Various other changes and modifications may be made without departing from the scope of the present invention, the present invention being limited by the following claims.

PARTS LIST

10 . . . optical system

11 . . . laser beam

12 ... laser
13 ... coupling means
14 ... medium
16 ... first optical fiber
18 ... second optical fiber
19 ... connector
20 ... output end
22 ... coupling imaging lens
24 ... modulator
25 ... polygon mirror
26,27,30,32 ... lenses
34 ... mirror
36,38 ... lenses
40 ... mirror
44 ... single glass molded lens
45 ... beam attenuating means
46 ... VPS lens

We claim:

1. An optical system for a laser printer, comprising:
a) a laser diode for producing a laser beam at a predetermined wavelength for scanning across a photosensitive media:
b) a single mode fiber connected to said laser diode for transmitting said beam from said laser diode to an object plane,
and further comprising c) a coupler for coupling said laser diode to said single mode fiber, wherein said coupler comprises a VPS lens which controls the high divergence direction of the beam such that the beam has an ellipticity ratio equal to or less than 2.0.

2. An optical system for a laser printer according to claim 1 wherein said coupler comprises a VPS lens which controls the high divergence direction of the beam such that the beam has an ellipticity ratio equal to or less than 1.25.

3. An optical system for a laser printer according to claim 2 wherein said lens controls the high divergence direction of the beam such that the beam has an ellipticity ratio substantially equal to 1.0.

4. An optical system for a laser printer, comprising:
a) a laser diode for producing a laser beam at a predetermined wavelength for scanning across a photosensitive media;
b) a single mode fiber connected to said laser diode for transmitting said beam from said laser diode to an object plane,
and further comprising c) a coupler for coupling said laser diode to said single mode fiber, wherein said coupler comprises a VPS lens which provides an astigmatism equal to or less than $0.1\lambda$ of the diode.

5. An optical system for a laser printer, comprising:
a) a laser diode for producing a laser beam at a predetermined wavelength for scanning across a photosensitive media;
b) a single mode fiber connected to said laser diode for transmitting said beam from said laser diode to an object plane,
and further comprising c) a coupler for coupling said laser diode to said single mode fiber, wherein said coupler comprises a VPS lens which provides an astigmatism with a Strehl ratio equal to or greater than 0.8.

6. An optical system for a laser printer according to claim 5 wherein said lens controls the high divergence direction of the beam such that the beam has an ellipticity ratio substantially equal to 1.0.

7. A coupler for coupling a laser diode of a predetermined wavelength to a single mode optical fiber, comprising a VPS lens which controls the high divergence direction of the beam so as to be substantially equal to the low divergence direction of the beam, the beam having an ellipticity ratio equal to or less than 2.0.

8. A coupler according to claim 7 wherein said VPS lens controls the high divergence direction of the beam such that the beam has an ellipticity ratio equal to or less than 1.25.

9. A coupler according to claim 7 wherein said VPS lens provides an astigmatism equal to or less than $0.1\lambda$ of the laser diode.

10. A coupler according to claim 7 wherein said VPS lens controls the high divergence direction of the beam such that the beam has an ellipticity ratio substantially equal to 1.

11. A coupler according to claim 7 wherein said VPS lens provides an astigmatism with a Strehl ratio equal to or greater than 0.8.

12. A coupler according to claim 7 wherein VPS lens provides an astigmatism with a Strehl ratio equal to or greater than 0.8 and which controls the high divergence direction of the beam such that the beam has an ellipticity ratio substantially equal to 1.0.

* * * * *